Oct. 6, 1942.  T. E. TORKELSON  2,297,816
ELECTRICAL CONTROL SYSTEM
Filed Dec. 14, 1938
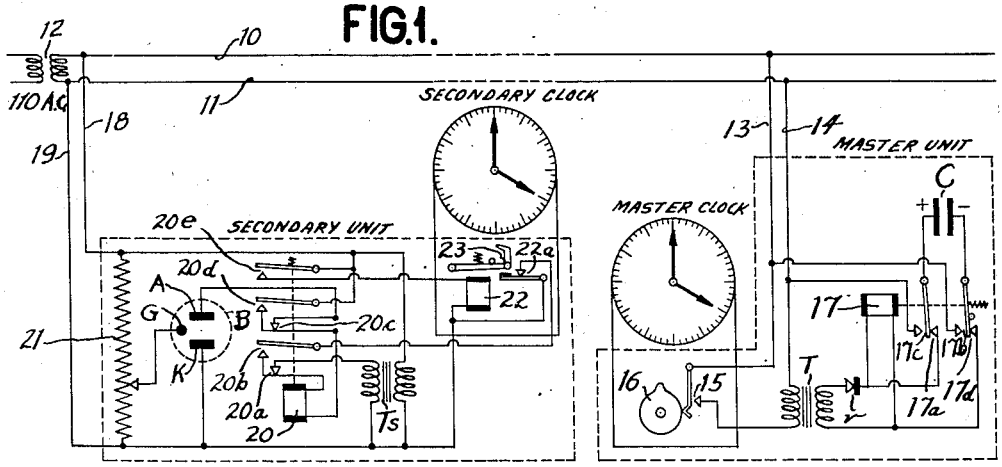
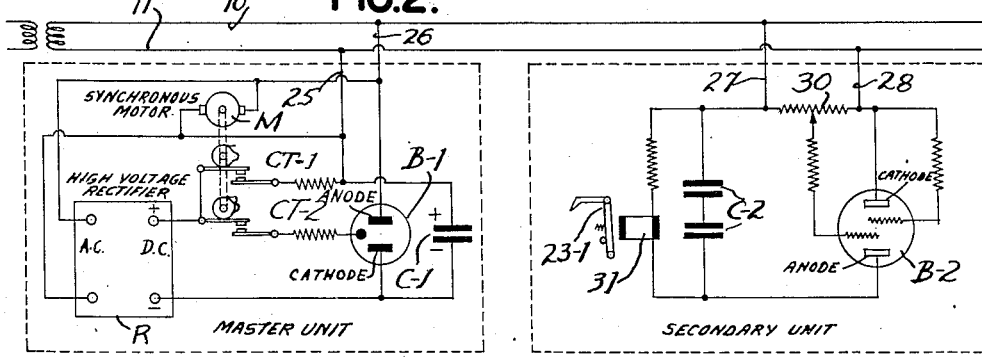
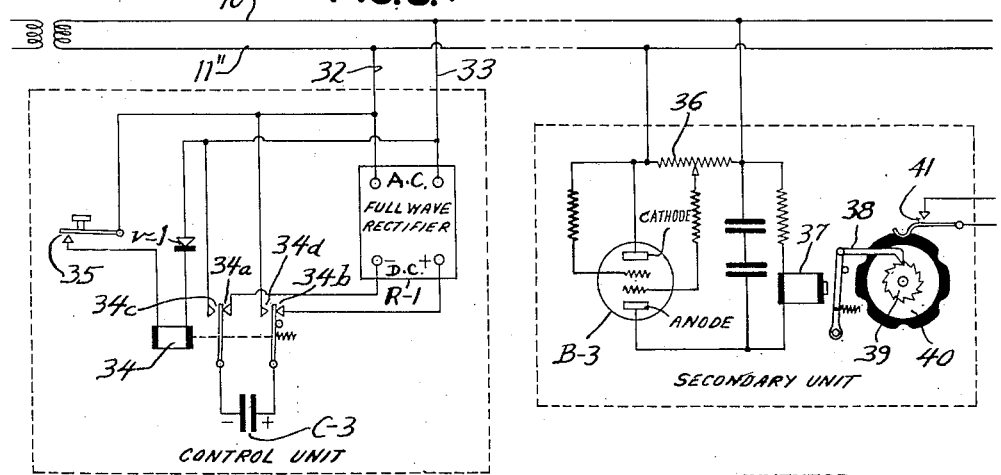
INVENTOR
Torkel E. Torkelson
BY
W. M. Wilson
ATTORNEY Patented Oct. 6, 1942

2,297,816

UNITED STATES PATENT OFFICE 2,297,816

ELECTRICAL CONTROL SYSTEM

Torkel E. Torkelson, Baldwin, N. Y., assignor to International Business Machines Corporation, New York, N. Y., a corporation of New York Application December 14, 1938, Serial No. 245,675

9 Claims. (Cl. 177—352)

This invention relates to an electrical control system in which a control operation is effected through an ultra-sensitive relay, such as an electronic tube.

The general object of the invention is to provide a system in which a high momentary E. M. F. is impressed on the current supply house or service line of a building, and in which an electronic device may be connected anywhere across the line and rendered responsive to the impressed momentary E. M. F. to cause a desired control operation, while at the same time the momentary E. M. F. has no effect on other electrical devices which may be connected to the line, nor is the electronic device responsive to ordinary fluctuations in the line. It is contemplated, moreover, that the electronic device be rendered responsive only to such a high E. M. F. as results from the superimposing of the transient E. M. F. on the normal, effective voltage of the line. Specifically, it is intended that the high momentary E. M. F. be generated by a condenser discharge, and that means be provided to charge the condenser from current supplied by the line, and in this connection, the invention provides novel means for charging the condenser and controlling its discharge into the line.

The invention further provides that the electronic device be embodied with the controlled instrumentality as a unit therewith which may be plugged or connected anywhere across the supply line to be operated under control of the electrostatic impulse superimposed on the normal line voltage. This controlled instrumentality may be a switch, magnet, secondary clock or other device to be operated only upon the occurrence of the electrostatic impulse.

In one form of the invention, the occurrence of one electrostatic impulse may effect one operation of a device, such as the closing of a switch and the next impulse the reverse operation of the device, as the opening of the switch.

In another form of the invention, the electrostatic impulses may be timed so as to cause timed operation of the clocks of a secondary clock system embracing units, including an electronic impulse sensing device, which may be connected anywhere across the lines.

While the invention is capable of operation with supply lines furnishing direct current, it is of particular advantage with A. C. lines in that the invention provides for the superimposing of the transient E. M. F. upon the effective or average E. M. F. or upon the peak of a wave to effect the control operation.

In connection with an A. C. supply line, in one form of the invention, means are provided to charge the condenser from the line during a rise of potential therein and to disconnect the condenser from the line during the occurrence of the effective E. M. F. and before the next reversal of polarity. In other forms of the invention, rectifying means are provided to continually charge the condenser from the A. C. line while its discharge may be controlled, either at will or under control of automatically operating means such as a switch operated by a synchronous motor or by a master clock, to be superimposed on the peak of an A. C. wave or on the effective E. M. F. of the supply line.

Further objects of the instant invention reside in any novel feature of construction or operation or novel combination of parts present in the embodiments of the invention described and shown in the accompanying drawing whether within or without the scope of the appended claims and irrespective of other specific statements as to the scope of the invention contained herein.

In the drawing:

Fig. 1 shows one form of the invention,

Fig. 2 shows a second form of the invention, and

Fig. 3 shows a third form which the invention may take.

Fig. 1 shows one form of the invention applied, for example, to operation of a secondary clock unit under control of a master clock unit. Each unit may be plugged anywhere across the sides 10 and 11 of a service or house line. As shown in Fig. 1, the house line is fed through a transformer 12 from a feeder line which may be a commercial A. C. supply. Due to the inductive coupling of the feeder to the house line, the transient control impulses, which as will be brought out later are electrostatic discharges, are confined to the house line in which the impulses are generated. It is understood, of course, that motors, lamps, and so on may be placed across the house line, and, as will be made clear later, the transient impulses for effecting control of the secondary unit do not have any practical effect on other loads placed across the house line, nor is operation of the secondary unit affected by operation of these other loads.

The master unit contains an impulse generator which includes a pair of leads 13 and 14 from the opposite sides 10 and 11 of the house line extending, respectively, to one side of a switch 15 and to one side of the primary of a step-up transformer T. It is understood that leads 13 and 14 may be gathered in a plug to be inserted in an outlet socket of the house line. The opposite side of the transformer primary is connected to the opposite side of switch 15. Switch 15 is closed intermittently once each minute, by a cam 16 driven by the master clock. The secondary of transformer T is connected through an unidirectional current valve $v$ to an alternating current type of relay 17 and to a condenser C, the valve $v$ permitting current to pass only when line side 10 is positive. Thus, should the instant of closure of contacts 15 occur while line side 10 was negative, operation of relay coil 17 and charging of condenser C would not take place. However, contacts 15 remain closed for several alternations of polarity in the line, so that as soon as the potential in line side 10 becomes positive, current will flow to coil 17 and condenser C. The coil 17 is effectively energized to operate its relay contacts only by a predetermined minimum duration of the effective or average E. M. F. of that voltage wave during which line side 10 is positive. Thus, should the instant of closure of contacts 15 occur while line side 10 was positive, but after some of the effective portion of the wave had passed, then an insufficient duration of application of the effective E. M. F. to relay coil 17 may result, and the contacts thereof would remain unoperated, although condenser C would be partially charged. The effective operation of coil 17 therefore would occur, under above conditions, during the portion of the next cycle in which line side 10 was positive, and coil 17 would receive the full application of the effective E. M. F. During this cycle also, the condenser C would be fully charged.

Coil 17 becomes operative to open contacts 17a and 17d, thereby disconnecting the condenser from the transformer secondary, and at the same time contacts 17c and 17b close to connect the condenser to the line sides 10 and 11 through the leads 13 and 14. This occurs while the effective or average E. M. F. is still on the house line and with line side 10 at positive potential. The direction of current in the transformer secondary circuit during the interval in which line side 10 is positive is such that the left side (as viewed in Fig. 1) of the condenser is the plus side. The condenser has a low internal resistance and upon its disconnection from the transformer secondary discharges almost instantaneously. The plus side of the condenser is connected, through contacts 17c and lead 14 to line side 11, now negative, while the negative side of the condenser is connected, through contacts 17b, and lead 13 to the now positive side 10 of the line. As a result, the electrostatic E. M. F. resulting from discharge of the condenser is added to or superimposed upon the effective potential across the supply line. Since the coil 17 was operated to transfer the condenser from the charging terminals 17a and d to the discharging terminals near the peak of the voltage wave, the condenser discharge is superimposed upon substantially the peak voltage across the supply line, providing a high but transient or momentary increase in the supply line voltage.

Connected anywhere across the supply line, through leads 18 and 19, is the operating means of the secondary clock unit. It is understood that leads 18 and 19 may be gathered in a plug to be plugged into any outlet socket of the house line. The operating means of the secondary unit includes an electronic device which may be a glow discharge or "trigger" relay type of tube B. The cathode K is connected through lead 19 to side 11 of the service power line. The anode A is connected, through relay contacts 20c, relay coil 20, and relay contacts 20a to one side of the secondary of a transformer Ts, the other side of which is connected to lead 19 of line side 11. The primary of this transformer is across the opposite sides of the supply line. The grid G of the tube has an adjustable connection to the potentiometer 21 connected through leads 18 and 19 to the opposite sides of the line. Adjustment of the grid connection to the potentiometer determines the breakdown or discharge of the tube for desired potentials on the anode and grid. The potentiometer is adjusted to prevent breakdown of the tube for potentials on the grid and anode resulting from less than a critical voltage on the supply line, and this critical voltage is greater than that due to any increase in voltage which may result from power or feed line fluctuations or from fluctuations in the service or house supply line due to operation or change in operation of other devices fed by the service line. The critical voltage for breaking down the tube is the total of the peak line voltage and the transient E. M. F. impressed on the line by the discharge of the condenser C of the master unit. The condenser discharge increases the voltage across the line sides 10 and 11 to an aggregate voltage equal to or greater than the critical voltage, causing the tube B to break down and permit current to flow through the anode circuit in which relay coil 20 is included. As a result, coil 20 is energized and closes relay contacts 20b, d and e, and, after closure of these relay contacts, opens contacts 20a and c. Opening of the contacts 20a and c opens the anode circuit so that further discharge through the tube is prevented. The closing of contacts 20d forms a holding circuit for coil 20, extending from line side 10, through lead 18, contacts 20d, coil 20, contacts 20b, contacts 22a, lead 19, and to the opposite line side 11.

The making of contacts 20e establishes a circuit through magnet 22, extending from line side 10, through lead 18, contacts 20e, magnet 22, and through lead 19, to the opposite line side 11. Magnet 22 operates the escapement pawl 23 of the secondary clock to cause a "minute" advance of the latter. As pawl 23 is operated by magnet 22, it opens contacts 22a in the holding circuit of coil 20. Since coil 20 is not to be effective more than once a minute, it must not be de-energized to return the plate circuit to control conditions before contacts 15 of the master unit break. After coil 17 of the master unit has been effectively energized, causing the condenser C to discharge, further charging while control contacts 15 remain closed cannot normally be effected because relay contacts 17a and b are open. However, to prevent the possibility that the relay contacts may flutter and momentarily return the condenser to the charging circuit, followed by an undesirable return to the discharge circuit, the holding circuit of secondary unit relay magnet 20 is not broken till after the master control contacts 15 open. Thus, a second operation of tube B and the secondary unit cannot occur for a single closure of contacts 15. For timing the breaking of the holding circuit of coil 20, contacts 22a are not opened till after contacts 15 have been opened. To delay opening of contacts 22a for the required interval, magnet 22 may be of the delay type, or other suitable means may be provided to prevent escapement 23 from opening contacts 22a until the required time has elapsed. The coil 20 is thus deenergized after contacts 15 have been opened, preparing the secondary unit for the operation upon the next closure of contacts 15 occurring at the next minute interval. In this manner, operation of the master unit causes synchronized, minute-by-minute operation of the secondary unit.

The discharge of condenser C is momentary and the additional voltage impressed thereby on the line does not furnish sufficient energy to exert any appreciable effect on other loads, such as lamps, motors, and so on across the line. Further, the critical voltage for causing the tube of the secondary to break down is higher than that due to fluctuations in the line resulting from the switching on or off of other loads across the line. This critical voltage is determined by adjustment of potentiometer 21 and the characteristics of electron space discharge tube B, as explained before, and the desired critical voltage is obtained by the required characteristics of the transformer T, the condenser C, and the relay coil 17 which times the condenser discharge to occur at or near the peak of the A. C. wave in the line.

In Fig. 2, another form of the invention is shown in which the control, master, or impulse generating unit is connected anywhere across the service line 10'—11' by plug wires 25 and 26, while the secondary or controlled unit is connected anywhere across the service line by plug wires 27 and 28. The master unit includes a synchronous motor M which operates contacts CT—1 and CT—2 in alternation each minute. When contacts CT—1 are closed, then contacts CT—2 are open and vice versa. A high voltage rectifier R in the master unit is connected to the line to furnish a high voltage direct current output. In operation, when contacts CT—1 close, a charging circuit is established for the control condenser C—1 of the master unit which extends from the + terminal of the output side of the high voltage rectifier, through the contacts CT—1, the + side of the condenser C—1, and from the — side of the condenser back to the — terminal of the output side of the rectifier. The condenser thus receives a high voltage charge during the closure of contacts CT—1 which endures for a fraction of a minute. Contacts CT—1 then open and contacts CT—2 close, applying the output voltage of the rectifier R to the grid of the trigger relay tube B—1, causing the latter to break down and become conductive. As a result, condenser C—1 now discharges into the line through the tube by the following circuit: From the negative side of condenser C—1, through the tube, plug wire 26, the connected line side, the opposite line side, plug wire 25, and to the positive side of the condenser. The condenser discharges its energy very rapidly. Contacts CT—2 are adjusted to cause breakdown of the trigger tube at the peak of the A. C. wave so that the condenser discharge is superimposed on the peak voltage of the service line. The condenser cannot be charged again during the same minute interval since the contacts CT—1 do not close again during this interval. Thus, for each minute interval, condenser C—1 is charged and then rapidly discharged across the line.

The secondary unit includes a trigger tube B—2 adjusted by potentiometer 36 so that the tube will not break down at the peak of the A. C. wave but will only become conductive when the electrostatic impulse generated by the master unit is superimposed on the peak of the A. C. wave. When the tube B—2 becomes conductive, it causes flow of current through the tube which passes through relay coil 31 and also charges condenser C—2, in parallel with the relay coil. The tube is conductive only for a short time or until the polarity of the service line changes, and then becomes non-conductive. Relay coil 31, however, remains energized for a longer period due to condensers C—2 discharging their energy into coil 31 after tube B—2 becomes non-conductive. Thus coil 31 remains energized long enough to operate escapement pawl 23—1 of the secondary clock unit.

In above manner, the form of the invention shown in Fig. 2 provides for operation of the secondary unit once each minute as a result of an electrostatic impulse impressed on the house line across which one or more of the secondary units may be connected to be controlled by the master unit. Obviously the rate of operation of the secondary unit may be varied by altering the periods of operation of contacts CT—1 and CT—2 by the synchronous motor.

Fig. 3 shows a form of the invention in which a control unit may be manually conditioned to cause mechanical operation of a device remotely connected to the current supply line. Specifically, Fig. 3 shows a control unit which is manually operated to close or open a switch in a secondary unit which may be plugged into the line at a location remote from the control unit. Thus, the control unit may be plugged into the line in one room of a building and the secondary unit plugged to the same line in another, remote room. The control unit may be connected by leads 32 and 33 to the sides 10'' and 11'' of the house line and includes a full wave high voltage rectifier R—1 which continually charges the condenser C—3 at a high voltage, the charging circuit extending from the output side of the rectifier to the opposite sides of the condenser through relay contacts 34a and 34b of a relay coil 34. The circuit of coil 34 extends from lead 33 through a unidirectional current valve v—1, through the coil and to one side of a hand switch 35, the other side of which is connected to lead 32. The energization of coil 34 is effected upon the closure of switch 35 by the operator and results in the opening of relay contacts 34a and b and the closing of contacts 34c and d. The opening of contacts 34a and b disconnects the condenser C—3 from the charging circuit and the closing of contacts 34c and d connects the condenser to the line through leads 32 and 33, causing the condenser to impress an electrostatic impulse on the line. The relay coil 34 is of the same type as coil 17 of the form of the invention shown in Fig. 1, so that discharge of the condenser is automatically timed to occur while the effective voltage is still on the line, with line side 10'' positive. Accordingly, the electrostatic impulse is added to the effective line voltage, providing a transient increased voltage to the line.

The receiving or secondary unit may be plugged anywhere across the line, and includes a trigger tube B—3 of the same type as tube B—2 of the form of the invention shown in Fig. 2. The tube is so adjusted by means of potentiometer 36 as to become conductive only upon the occurrence of the increased voltage in the line due to the normal line voltage and the added transient voltage applied to the line by the control unit. When the tube B—3 becomes conductive, magnet 37 is energized, attracting pawl 38. The energization of magnet 37 is very brief, and upon its deenergization, pawl 38 operates on a ratchet wheel 39 to advance a make and break cam disk 40 one step. Coacting with disk 40 is a switch 41. If the switch 41 is initially open, the step up advance of disk 40 causes the switch 41 to close, while if the switch 41 is initially closed, the step up movement of disk 40 causes opening of the switch. In above manner, successive operations of the switch 35 in the control unit will cause alternate, reverse operations of the switch 41 in the secondary unit.

While there has been shown and described and pointed out the fundamental novel features of the invention as applied to several illustrative embodiments, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is:

1. An electrical control system comprising an electric power supply line, control apparatus including a condenser, a circuit, switch means effective upon and during closure to cause the circuit to be powered from the line, transfer switching means for alternatively connecting the condenser to the circuit to be charged and to the power supply line to discharge thereon, a relay coil connected to the circuit and energized thereby to operate the switching means for disconnecting the condenser from the circuit and connecting it to the power line to superimpose the condenser discharge upon the line voltage so as to increase the voltage on the line momentarily by at least a predetermined minimum amount above normal, and a controlled unit embodying an electronic valve connected to the line remotely from said apparatus and adjusted to remain unresponsive to the normal line voltage but to respond sensitively to the increased line potential for causing operation of the controlled unit upon each discharge of the condenser upon the line.

2. The control system as defined in claim 1, said power line affording alternating current, said circuit including rectifier means for passing current in only one direction to the relay coil and condenser, and said relay coil being so constructed as to be effectively energized only by the power derived from a substantial, increasing portion of the half cycle of an alternating current wave in said direction so as to operate the switching means to connect the condenser to the power line as said half cycle is substantially at its peak.

3. An electrical control system comprising an electric power supply line, primary timed means for periodically, momentarily superimposing an extra cumulative voltage to the line voltage to provide a momentarily increased line voltage, and a controlled unit connected to the line and embodying an electronic, space discharge valve and a circuit therefor powered from the line and including relay contacts and a relay coil in series therewith, said valve being unresponsive to the normal line voltage but responsive to the momentarily increased line voltage to break down and pass current through said circuit for energizing said relay coil, said coil thereupon opening said relay contacts to disconnect the valve from said circuit, a holding circuit for the coil including contacts closed thereby, and secondary timed means controlled by the coil upon energization thereof for effecting an operation synchronized with an operation of the primary timed means.

4. An electrical control system comprising apparatus connected to an A. C. line and including a condenser, a voltage rectifier connected to the line, a normally inert electronic, space discharge valve having an anode connected to one side of the line and a cathode connected to the minus side of the condenser, the plus side of the condenser being connected to the side of the line opposite the anode-connected side, said valve being operative when space discharge occurs to connect the condenser to the line, switching means for connecting the rectifier successively to the condenser and to the electronic valve whereby the condenser is first charged by the rectifier and then breakdown voltage applied to the electronic valve by the rectifier to effectively connect the condenser to the line, said condenser upon its connection to the line discharging thereon to impose an electrostatic impulse momentarily on the normal voltage portion of a half cycle of an A. C. wave so as to provide a momentarily increased voltage on the line, and a controlled unit embodying an electronic valve connected to the line remotely from said apparatus and adjusted to respond only to the momentarily increased line voltage for causing operation of the controlled unit upon each discharge of the condenser on the line.

5. An electrical control system comprising apparatus connected to an A. C. line and including a condenser and means for timing discharge of the condenser to superimpose a substantially instantaneous single surge impulse on substantially the peak voltage portion of an A. C. wave on the line so as to provide a momentary single total voltage surge upon the line equal to the sum of the single surge impulse voltage and said substantially peak line voltage, and a controlled unit connectable anywhere across the line remotely from said apparatus and including a work agency and a trigger tube in circuit therewith, said trigger tube being adjusted to remain unresponsive to the peak line voltage but to become unidirectionally conductive in response to said momentary single total voltage surge for causing a single, separate operation of the work agency for each single surge impulse discharge by the condenser on the line.

6. An electrical control system such as set forth in claim 5, including means connected to the A. C. line for charging the condenser from the line and said timing means operating upon initiation of the discharge of the condenser to disconnect the condenser from the charging means.

7. An electrical control system such as defined in claim 5, including means comprising a rectifier connected to the A. C. line for providing a rectified charging circuit for the condenser and a switch in the charging circuit closed during charging of the condenser and opened by the timing means concurrently with initiation of condenser discharge.

8. An electrical control system comprising apparatus connected to an A. C. line and including a rectifier, a condenser having its plus side connected to one side of the line, a trigger tube having an anode element connected to the opposite side of the line and a cathode element connected to the minus side of the condenser, and including a control grid, a circuit connection between the plus side of the rectifier and the plus side of the condenser and including a switch closure of which causes the condenser to be charged by the rectifier, a circuit connection between the plus side of the rectifier and the control grid and including a switch closure of which activates the grid to render the tube conductive, timing means alternately closing the switches so that one switch is open during one interval while the other is closed and vice versa during a succeeding interval whereby the condenser is charged during an interval and the tube rendered conductive during a succeeding interval to cause the condenser to discharge therethrough upon the line to superimpose the discharge voltage on the line, and a controlled unit connected to the line remotely from said apparatus and including an electronic device responsive to the superimposed discharge voltage upon the line, and a work agency connected to the electronic device for operation upon response of the electronic device to the superimposed voltage.

9. An electrical control system comprising an electric power supply line, control apparatus including a condenser, a charging circuit powered from the line, transfer switching means for alternatively connecting the condenser to the charging circuit to be charged and to the supply line to discharge thereon, a relay coil for operating the transfer switching means, means including a switch for connecting the coil to the line to be energized thereby for operating the transfer switching means to disconnect the condenser from the charging circuit and to connect it to the power line to superimpose the condenser discharge upon the line voltage so as to increase the voltage on the line momentarily by at least a predetermined amount above normal, and a controlled unit embodying an electronic valve connected to the line remotely from said apparatus and adjusted to respond only to the momentarily increased line voltage for causing operation of the controlled unit upon each discharge of the condenser on the line.

TORKEL E. TORKELSON.